(12) United States Patent
Krasner et al.

(10) Patent No.: US 11,119,802 B2
(45) Date of Patent: Sep. 14, 2021

(54) METHOD AND SYSTEM FOR OFFLOADING PARALLEL PROCESSING OF MULTIPLE WRITE REQUESTS

(71) Applicant: EMC IP Holding Company LLC, Hopkinton, MA (US)

(72) Inventors: Jonathan I. Krasner, Coventry, RI (US); Sweetesh Singh, Benares (IN); Steven R. Chalmer, Redwood City, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 16/400,926

(22) Filed: May 1, 2019

(65) Prior Publication Data
US 2020/0348957 A1 Nov. 5, 2020

(51) Int. Cl.
| *G06F 9/46* | (2006.01) |
| *G06F 9/455* | (2018.01) |
| *G06F 9/50* | (2006.01) |
| *G06F 9/38* | (2018.01) |
| *G06F 9/54* | (2006.01) |

(52) U.S. Cl.
CPC ........ *G06F 9/45558* (2013.01); *G06F 9/3877* (2013.01); *G06F 9/505* (2013.01); *G06F 9/544* (2013.01); *G06F 2009/4557* (2013.01)

(58) Field of Classification Search
CPC .... G06F 9/45558; G06F 9/3877; G06F 9/505; G06F 9/544; G06F 2009/4557
See application file for complete search history.

(56) References Cited

U.S. PATENT DOCUMENTS

| 7,284,119 | B2 | 10/2007 | Hyder et al. | |
|---|---|---|---|---|
| 7,656,894 | B2 | 2/2010 | Dube et al. | |
| 9,477,466 | B2 | 10/2016 | Nishimoto et al. | |
| 9,529,620 | B1 | 12/2016 | Dow et al. | |
| 10,353,722 | B2 | 7/2019 | Karino et al. | |
| 2003/0084435 | A1 | 5/2003 | Messer et al. | |
| 2006/0098018 | A1* | 5/2006 | Tarditi, Jr. | G06F 8/45 345/505 |
| 2007/0256058 | A1* | 11/2007 | Marfatia | G06F 8/51 717/137 |
| 2011/0154334 | A1 | 6/2011 | Beale | |
| 2012/0110346 | A1* | 5/2012 | Resch | G06F 16/11 713/189 |
| 2014/0189039 | A1 | 7/2014 | Dalton et al. | |
| 2015/0154111 | A1 | 6/2015 | Dabreu et al. | |
| 2016/0164962 | A1 | 6/2016 | Ghosh et al. | |
| 2017/0085636 | A1 | 3/2017 | Lin et al. | |
| 2017/0289059 | A1 | 10/2017 | Wu et al. | |
| 2018/0046385 | A1* | 2/2018 | Altaparmakov | G06F 12/0868 |
| 2020/0334184 | A1 | 10/2020 | Suresh et al. | |

* cited by examiner

*Primary Examiner* — Camquy Truong
(74) *Attorney, Agent, or Firm* — Chamberlain, Hrdlicka, White, Williams & Aughtry

(57) ABSTRACT

A method for processing data includes receiving a write request by a host operating system during a predetermined time window, storing data associated with the write request in a shared memory, making a first determination that a threshold number of write requests are obtained within the predetermined time window, and, in response to the first determination, sending an offload request to a virtual machine (VM), wherein the offload request specifies at least the write request.

17 Claims, 5 Drawing Sheets

METHOD AND SYSTEM FOR OFFLOADING PARALLEL PROCESSING OF MULTIPLE WRITE REQUESTS

BACKGROUND

Computing devices may include any number of internal components such as processors, memory, and persistent storage. As the number of internal components in a computing device increases, the complexity of efficiently using all of the internal components also increases. As a result, the internal components in a computing device are often not utilized in the most efficient manner, e.g., to maximize the performance of the computing device.

SUMMARY

In general, in one aspect, the invention relates to a method for processing data in accordance with one or more embodiments of the invention. The method includes receiving a write request by a host operating system during a predetermined time window, storing data associated with the write request in a shared memory, making a first determination that a threshold number of write requests are obtained within the predetermined time window, and, in response to the first determination, sending an offload request to a virtual machine (VM), wherein the offload request specifies at least the write request.

In one aspect, a non-transitory computer readable medium in accordance with one or more embodiments of the invention includes computer readable program code, which when executed by a computer processor enables the computer processor to perform a method for processing data. The method includes receiving a write request by a host operating system during a predetermined time window, storing data associated with the write request in a shared memory, making a first determination that a threshold number of write requests are obtained within the predetermined time window, and, in response to the first determination, sending an offload request to a virtual machine (VM), wherein the offload request specifies at least the write request.

In one aspect, a system in accordance with one or more embodiments of the invention includes a processor and memory which includes instructions, which when executed by the processor, perform a method for processing data. The method includes receiving a write request by a host operating system during a predetermined time window, storing data associated with the write request in a shared memory, making a first determination that a threshold number of write requests are obtained within the predetermined time window, and, in response to the first determination, sending an offload request to a virtual machine (VM), wherein the offload request specifies at least the write request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for processing data. More specifically, embodiments of the invention relate to a method for a host operating system of a host computing device to offload a processing of data to graphics processing units (GPUs). Embodiments of the invention may obtain a request to process data (e.g., a write request) and store the data associated with the request in a shared memory accessible to the GPUs. The host operating system may, after either: (i) storing a threshold number of write request, or (ii) reaching a time window to store service the request, may send an offload request to a specialized VM communicating with the GPUs to perform the data processing.

Figure 1:
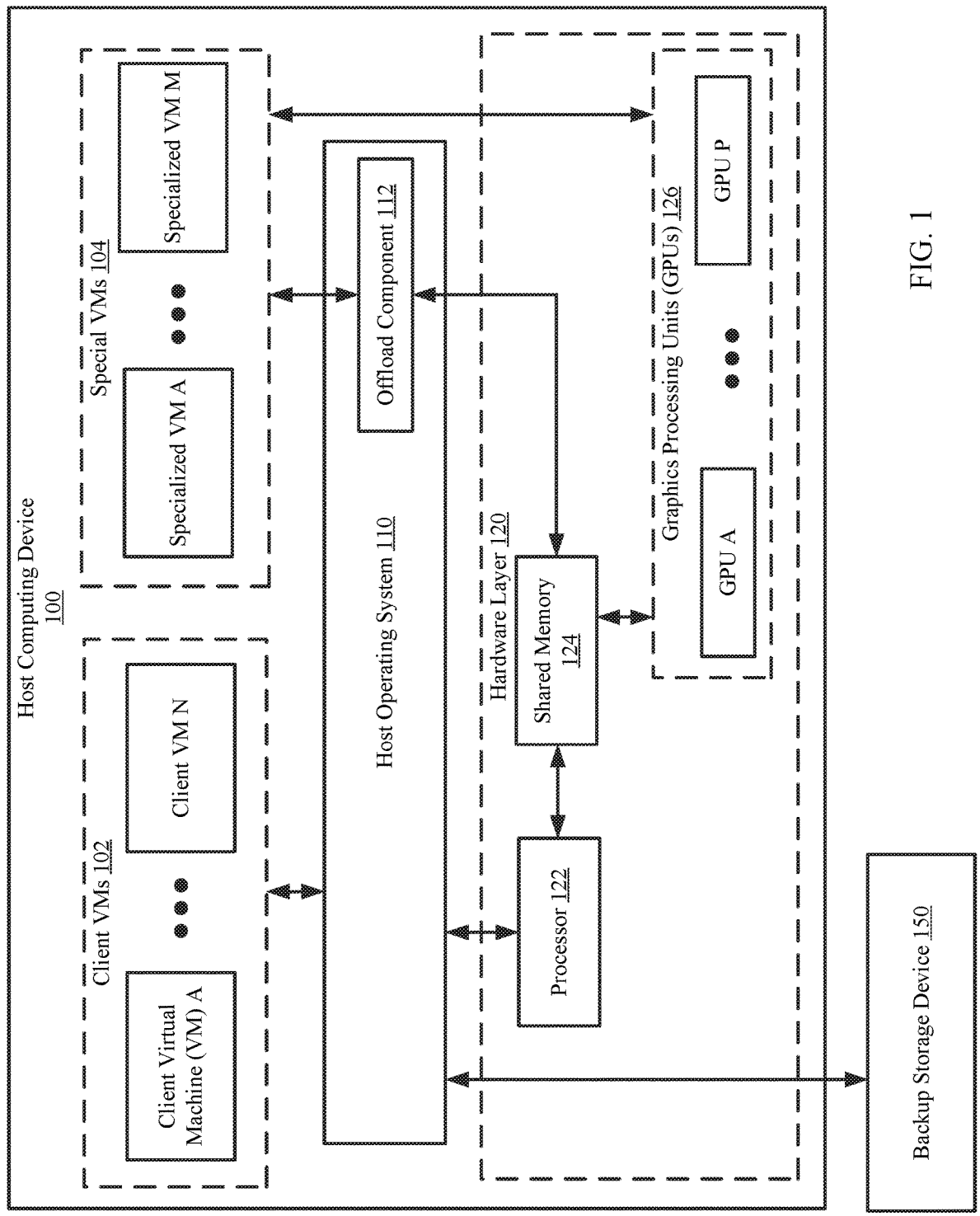
FIG. 1 shows a diagram of a system in accordance with one or more embodiments of the invention.

FIG. 1 shows an example system in accordance with one or more embodiments of the invention. The system includes a host computing device (100) and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, the host computing device (100) hosts any number of client virtual machines (VMs) (102). The client VMs (102) may be logical entities executed using computing resources (e.g., components of a hardware layer (120)) of the host computing device (100). Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

In one or more embodiments of the invention, the host computing device (100) hosts specialized VMs (104). The specialized VMs (104) include functionality to interact with the graphical processing units (GPUs) (126). More specifically, the specialized VMs (104) include computer readable code (e.g., the GPU drivers and other related software components) that enables the specialized VMs to interact with the GPUs based on the Application Program Interfaces (APIs) or communication specifications of the GPUs (126). The specialized VMs (104) may interact with the components of the hardware layer (120) without using the host OS (110); rather, the specialized VMs may interact with the components of the hardware layer (120) using a communication protocol such as a peripheral component interconnect (PCI) pass-through. In one or more embodiments of the invention, the specialized VMs (104) each include their own operating system (OS) that allows the specialized VMs (104) to perform the aforementioned functionality. The OSes executing in the specialized VMs (104) may be equipped to communicate with an offload component (112) of the host OS (110).

In one or more embodiments of the invention, instead of communicating directly with the GPUs, the specialized VMs (104) may communicate with the GPUs using a hypervisor (not shown). The hypervisor may be an entity that is interposed between the specialized VMs (104) and the offload component (112) of the host OS (110). Further, the hypervisor may be equipped to facilitate communication between the specialized VMs and the GPUs (126) and interface with the specialized VMs (104). In this scenario, each of the specialized VMs (104) may communicate with the GPUs (126) through the hypervisor. Other protocols or communication mechanisms may be used without departing from the invention.

In one embodiment of the invention, the host computing device may include different types of GPUs, where each of the different types of GPUs use different communication protocols and/or have different functionality. In this scenario, the host computing device may include different types of specialized VMs; each type of specialized VMs is able to interact with a specific type of GPU. In such scenarios, the different types of the specialized VMs may be optimized to work with particular types of GPUs. Further, if a new GPU is added to the host computing device, a new or modified specialized VM may be added to the host computing device such that the host computing device can utilize the new GPU.

In one embodiment of the invention, the specialized VMs include functionality to service offload requests (discussed below in FIGS. 2A-2B) in a manner that most efficiently utilizes the GPUs processing capabilities, such as parallel processing.

Additional detail about various embodiments related to the operation of the specialized VMs is provided below with respect to FIG. 2B.

Figure 2A:
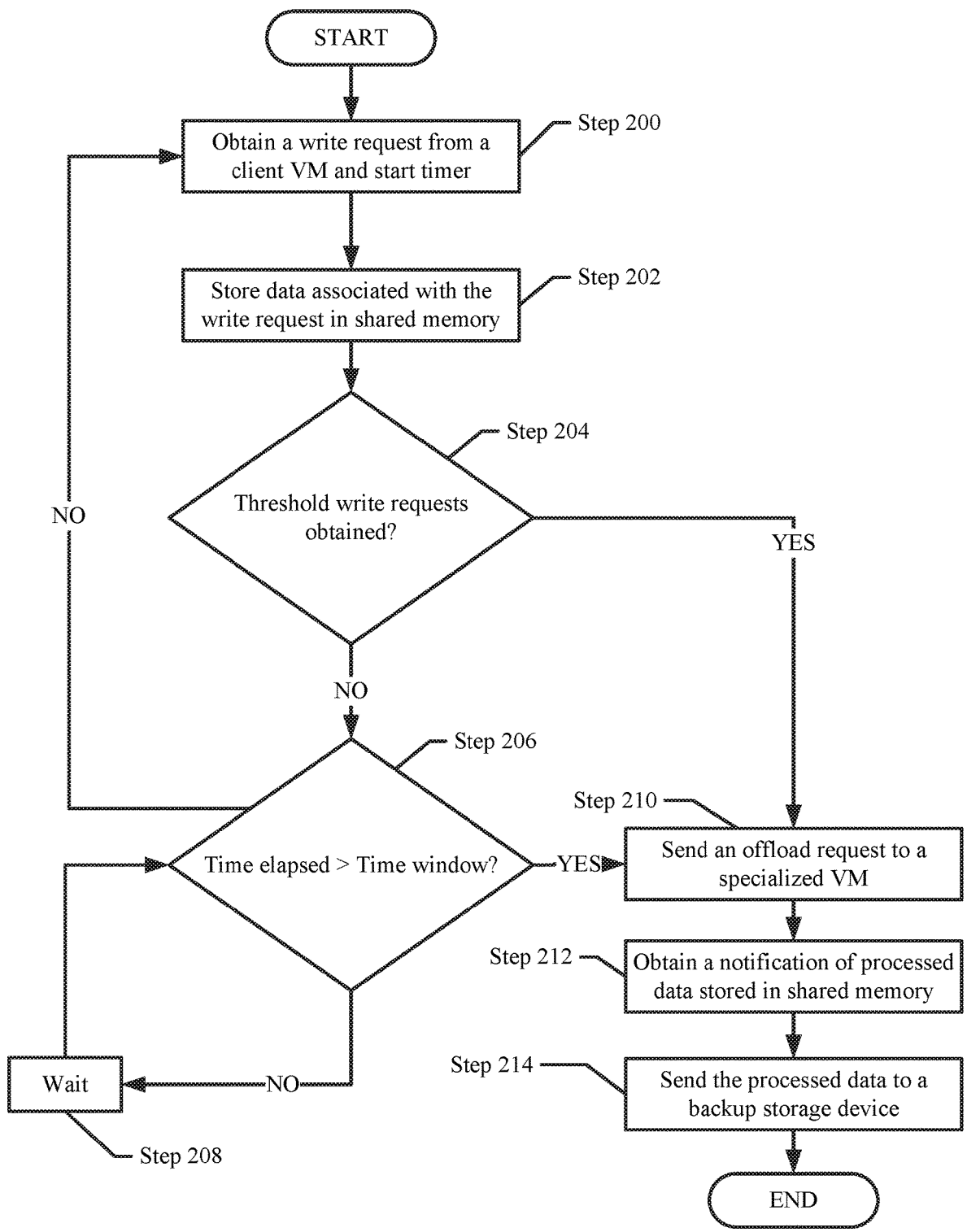
FIG. 2A shows a flowchart for processing write requests in accordance with one or more embodiments of the invention.
Figure 2B:
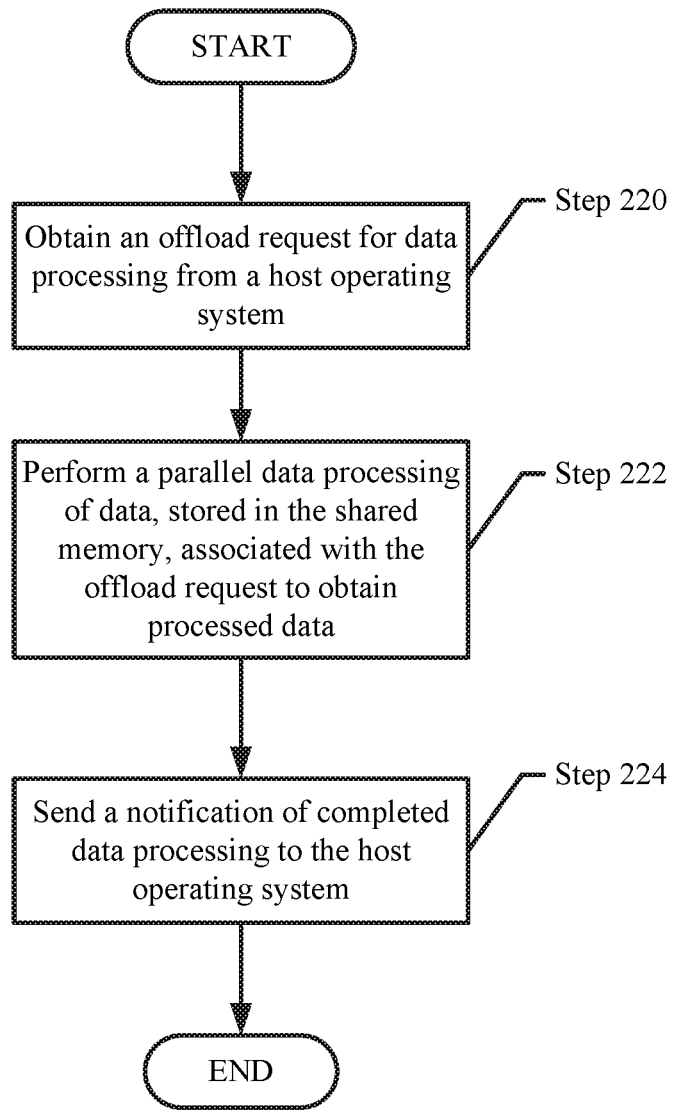
FIG. 2B shows a flowchart for processing data in accordance with one or more embodiments of the invention.
Figure 3:
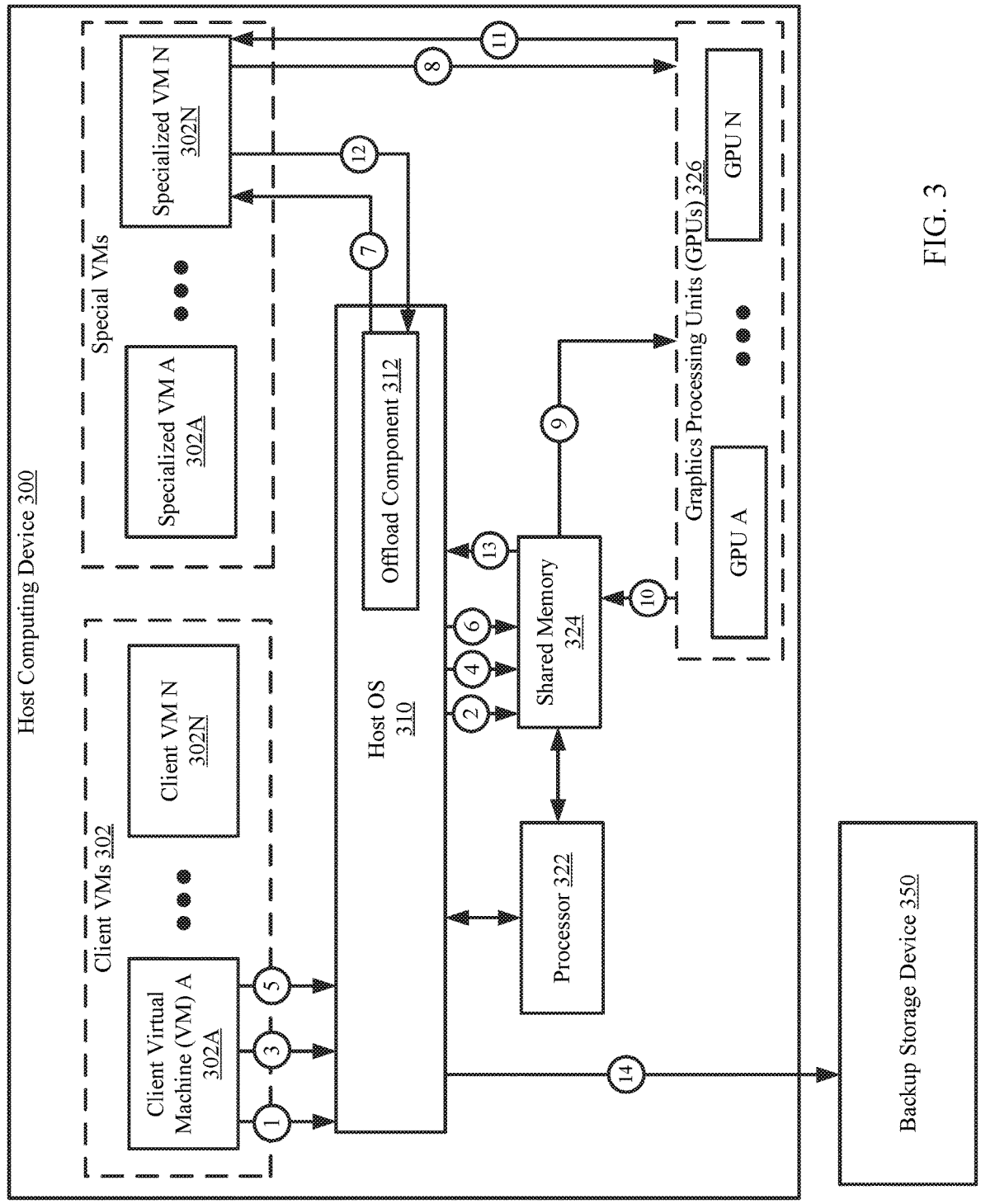
FIG. 3 shows an example in accordance with one or more embodiments of the invention.

In one or more of embodiments of the invention, the virtual machines (102, 104) are implemented as computer instructions, e.g., computer code, stored on a persistent storage that when executed by a processor(s) (e.g., 122) of the host computing device (100) cause the host computing device (100) to provide the functionality of the virtual machines (102, 104) described throughout this application and/or all, or a portion thereof, of the methods illustrated in FIG. 2B.

In one or more embodiments of the invention, the hardware layer (120) includes computing resources utilized by components (e.g., the host OS (110), client VMs (102), the specialized VMs (104), and/or the offload component (112)) of the host computing device (100) to perform the functionalities specified by each respective component. The computing resources may include a processor(s) (122), shared memory (124), and one or more graphics processing units (GPUs) (126). Each computing resource of the hardware layer (120) may be operably connected via any combination of wired connections. Each computing resource of the hardware layer (120) is discussed below.

The processor (122) may be a computing resource that processes information (e.g., data) as requested by a component and sends the processed data to the requested entity. Processing data may include arithmetic calculations, logic processing, and/or other input/output operations without departing from the invention. In one or more embodiments of the invention, the processor (122) is implemented as a central processing unit (CPU) with single-core or multi-core processing capabilities. The processor (122) may be other types of processors without departing from the invention.

The shared memory (124) is volatile memory that may be accessed by two or more components of the host computing device (100). In one or more embodiments of the invention, the shared memory (124) is implemented as, for example, static random access memory (SRAM), dynamic random access memory (DRAM), and/or other types of memory without departing from the invention.

In one or more embodiments of the invention, the processor (122) includes additional memory (not shown) that may be used by the processor when processing data. The additional memory may be separate from the shared memory (124). The additional memory and the shared memory (124) may be operatively connected via a PCI express (PCI-E) bus that facilitates data transfer between the additional memory and the shared memory (124). Other communication mechanisms may be used to transfer data between the various shared memories without departing from the invention.

The GPUs (126) are a type of processor that includes a significantly larger number of cores than the processor (122) discussed above. The GPUs (126) may utilize the multiple cores to perform a large number of processes in parallel. The processes performed by the GPUs (126) may include basic arithmetic operations. The GPUs may perform additional types of processes without departing from the invention.

In one or more embodiments of the invention, the GPUs (126) include computing resources that allow the GPUs to perform the functions described throughout this application. The computing resources (not shown) within the GPUs may include cache, local memory (e.g., dynamic random access memory (DRAM)), and the cores discussed above. The cores may be capable of processing one or more threads (e.g., processes performed on data by a core of the GPU) at a time and temporarily storing data in the cache and/or local memory during the processing.

In one or more embodiments of the invention, the host computing device (100) operates using a host operating system (OS) (110). The host OS (110) is an operating system that manages the operation of the client VMs (102), the specialized VMs (104), and the hardware layer (120). The host OS (110) may service requests obtained from one or more of the client VMs (102). In one or more embodiments of the invention, the host OS (110) services the requests by assigning tasks to the specialized VMs (104) based on the requests. In one or more embodiments of the invention, the host OS (110) services the requests via the method illustrated in FIG. 2A.

In one or more embodiments of the invention, the host OS (110) is implemented as computer instructions, e.g., computer code, stored on a persistent storage that when executed by a processor(s) (e.g., 122) of the host computing device (100) cause the host computing device (100) to provide the functionality of the host OS (110) described throughout this application.

In one or more embodiments of the invention, the host OS (110) includes an offload component (112) that serves as an interface between the host OS (112) and the specialized VMs (104). The offload component (112) may send requests, updates, and or any other type of data to one or more of the specialized VMs (104) as specified by the host OS (110). In one or more embodiments of the invention, the offload component is implemented as, for example, an application programming interface (API). The offload component (112) may include functionality that allows the offload component (112) to communicate with operating systems of each of the specialized VMs (104).

In one or more embodiments of the invention, the offload component (112) is implemented as computer instructions, e.g., computer code, stored on a persistent storage that when executed by a processor(s) (e.g., 122) of the host computing device (100) cause the host computing device (100) to provide the functionality of the offload component (112) described throughout this application.

In one or more embodiments of the invention, the backup storage device (150) stores data, where the data may (but is not required to) be stored using RAID or another data protection scheme. The backup storage device may include multiple disks (e.g., hard disk drives, solid state drives, etc.).

Figure 4:
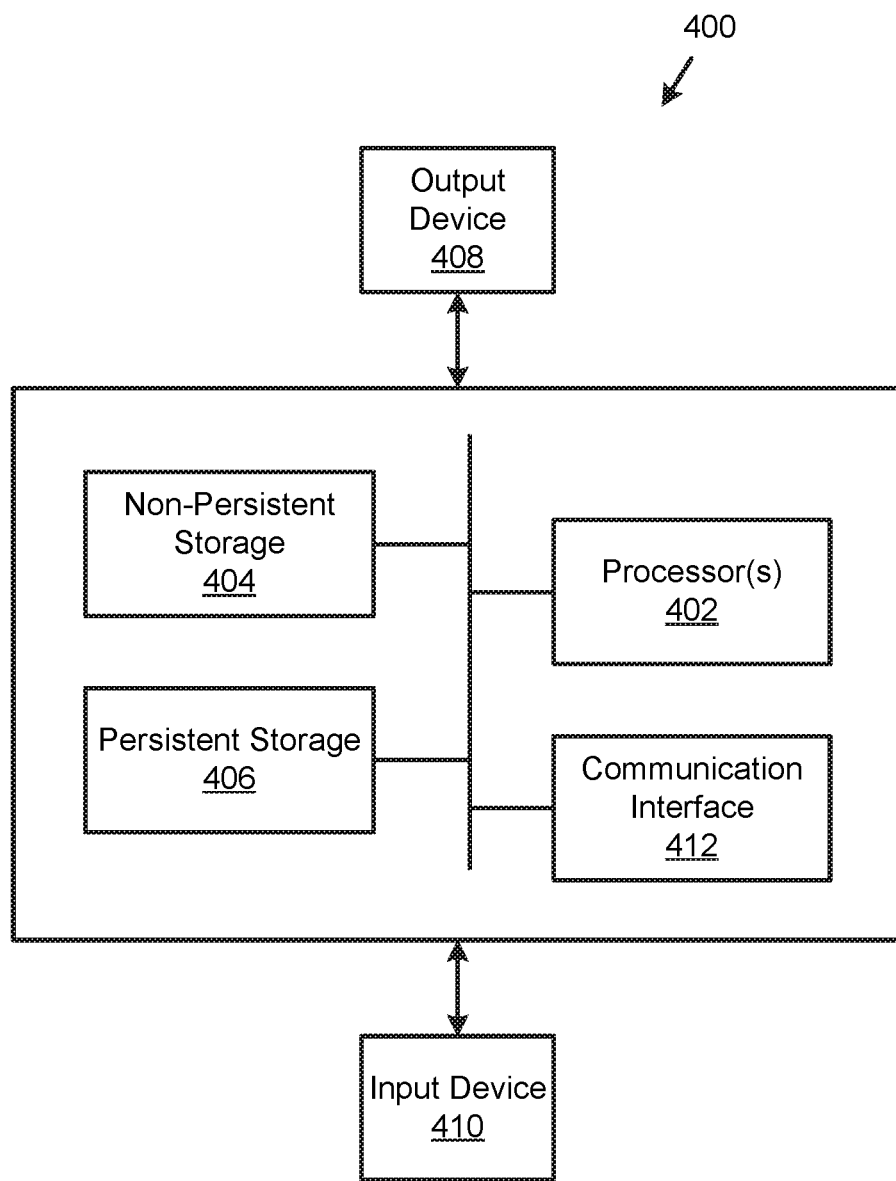
FIG. 4 shows a diagram of a computing device in accordance with one or more embodiments of the invention.

In one or more embodiments of the invention, the backup storage device (150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device described throughout this application.

In one or more embodiments of the invention, the backup storage device (150) is implemented as a logical device. The logical device may utilize the computing resources of any number of computing devices and thereby provide the functionality of the backup storage device (150) described throughout this application.

In one or more embodiments of the invention, the clients (not shown) that interact with the host computing device may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client described throughout this application.

In one or more embodiments of the invention, the client is implemented as a logical device. The logical device may utilize the computing resources of any number of computing devices and thereby provide the functionality of the client described throughout this application.

While FIG. 1 shows the architecture of the host computing device, the invention is not limited to the architecture shown in FIG. 1.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for processing write requests in accordance with one or more embodiments of the invention. The method shown in FIG. 2A may be performed by, for example, a host OS (110, FIG. 1). Other components of the system illustrated in FIG. 1 may perform the method of FIG. 2A without departing from the invention.

Turning to FIG. 2A, in step 200, a write request is received (or otherwise obtained) from a client VM. In response to the write request, a timer for time elapsed is started. The timer tracks the amount of time that elapsed since the write request was received by the host OS.

In one or more embodiments of the invention, the write request may include (or otherwise specify) the data that is the subject of the write request, and it may also specify (but is not required to specify) a processing task to perform on the data as part of servicing the write request. Examples of processing tasks that may process data include lossless compression algorithms, deduplication operations, redundant array of independent disks (RAID) parity calculations, data integrity calculations (e.g., cyclic redundancy check (CRC)), and/or any other tasks without departing from the invention.

In one or more embodiments of the invention, a lossless compression algorithm is an algorithm that encodes the data (i.e., a file) wherein the encoded portions take up less data than the original portions for the purpose of reducing the total amount of data used by the file. The files that have undergone lossless compression may be restored to the original data through decoding the encoded portions. Examples of lossless compression algorithms include a Lempel-Ziv-Markov chain algorithm (LZMA), run-length encoding (RLE), and/or other types of compression without departing from the invention.

In one or more embodiments of the invention, the data integrity calculations are calculations performed for the purpose of protecting the data and ensuring data integrity after the data is stored. Data integrity may be a measurement of the consistency of data during the generation, storage, and recovery of the data. Data integrity may be monitored using, for example, a data integrity field (DIF). A DIF is additional data added to original data for data protection purposes during storage. The DIF may include adding an 8-byte extension to a 512-byte file. The data in the 8-byte extension may include additional metadata and/or protection tags. The additional 8-byte extension may be used to check the data integrity of the stored data to determine proper storage of the data.

In step 202, data associated with the write request is stored in shared memory.

In step 204, a determination is made about whether a threshold number of write requests have been obtained. In one or more embodiments of the invention, the threshold number of write requests corresponds to a number of write requests that may be serviced in parallel by a GPU(s). The determination in step 204 may include determining the number of write requests that have been received but not yet offloaded to the specialized VMs for servicing. The host OS may maintain a count of the number of such write requests. If a threshold number of write requests have been obtained, the method proceeds to step 210; otherwise, the process proceeds to step 206.

In step 206, a determination is made about whether a time elapsed of each write requests that is to be processed exceeds a time window associated with the write request. In one or more embodiments of the invention, the time elapsed of a write request is tracked by the timer (which is maintained by the host OS) started in step 200 for the write request. The elapsed time specified by the timer is compared to the time window associated with the write request to determine if the elapsed time exceeds the time window for the associated write request. If the time elapsed of a write request exceeds a corresponding time window, the method proceeds to step 210; otherwise, the method proceeds to step 208.

In one or more embodiments of the invention, the time window is a predetermined period of time in which the host OS may store data associated with the data set before offloading data processing associated with the write request to a specialized VM. The time window may be set by the host OS, by the client, or by other entities without departing from the invention. Further, the time window may be tracked on a per-write request basis. In this manner, a given write request will be serviced no later than the end of the associated time window; however, the write request may be serviced sooner (i.e., prior to the end of the associated time window) if the number of write requests exceeds a predetermined window.

In one embodiment of the invention, any received or obtained write requests are temporarily stored by the host OS (with the associated data being stored in the shared memory) until either a determination in step 204 or 206 triggers the offloading of the write request.

In step 208, the host OS waits for a period of time. In one or more embodiments of the invention, the period of time may be predetermined by the host OS. The period of time may be one or more units of time that are significantly smaller than the time window. Once the period of time has elapsed, then process proceeds to step 206. In one embodiment of the invention, the determination in step 206 is performed on a per-write request basis. Accordingly, when the write request is initially received (e.g., via step 200) and the threshold number of write requests has not yet been obtained, the write request is temporarily stored by the host computing device until either the associated time window for the write request expires or the threshold number of write requests have been received. By implementing these two determinations, embodiments of the invention are able to balance optimizing the usage of the GPUs while at the same time ensuring that each write request is serviced no later than its associated time window.

If the threshold number of write requests or if a time window for a given write request has elapsed, the process proceeds to step 210. If process proceeds to step 210 directly from step 204, then the offloading in step 210 includes offloading a threshold number of write requests.

However, if the process proceeds to step 210 directly from step 206, then the offloading in step 210 includes offloading a single write request (i.e., the write request for which the time window has elapsed). In another scenario, if the process proceeds to step 210 directly from step 206, then the offloading in step 210 includes offloading all write requests that have not been serviced and are currently stored by Host OS.

Continuing with the discussion of FIG. 2A, in step 210, an offload request is sent to a specialized VM. The host OS may send the offload request using an offload component of the host OS. In one or more embodiments of the invention, the offload component obtains a request to offload the data processing of obtained one or more write requests, which have not been processed, and converts the request to a format readable to the specialized VM. The converted request (i.e., the offload request) may be subsequently sent to the specialized VM. In another embodiment of the invention, there may be one offload request for each write requests being offloaded.

In one or more embodiments of the invention, the specialized VM performs data processing on the data stored in the shared memory via the method illustrated in FIG. 2B. The specialized VM may perform the processing via other methods without departing from the invention. In one or more embodiments of the invention, the offload request specifies a processing task to be performed on the data (e.g., a parity calculation, a data integrity field calculation (DIF), etc.) based on a request obtained by the client.

In step 212, after the specialized VM has completed the data processing (in response to the offload request that was issued in step 210), a notification of the completed data processing is obtained by the host OS.

In one or more embodiments of the invention, the notification is sent from the specialized VM that obtained the offload request in step 210. The offload component may convert the notification to a readable format for the host OS. The notification may specify that the processed data is stored in the shared memory. Further, the notification may include an address(es) for the processed data that the host OS may use to retrieve the processed data.

In step 214, the processed data is obtained from the shared memory and sent to a backup storage device. In one or more embodiments of the invention, the host OS utilizes computing resources (e.g., a processor) of the hardware layer of the host computing device to send the processed data.

FIG. 2B shows a flowchart for processing data in accordance with one or more embodiments of the invention. The method shown in FIG. 2B may be performed by, for example, a specialized VM. Other components of the system illustrated in FIG. 1 may perform the method of FIG. 2B without departing from the invention.

In step 220, an offload request for data processing is obtained from a host operating system. The offload request may specify a processing task to perform on data stored on shared memory and references to location(s) for the data stored in the shared memory.

In step 222, the specialized VM initiates parallel processing of data associated with the offload request to obtain processed data. In one or more embodiments of the invention, the data processing is initiated by identifying the processing task from the offload request and sending processing requests to GPUs.

In one or more embodiments of the invention, each processing request specifies the processing task and data (or the location of the data in the shared memory) to be processed. The GPUs may service the processing requests in parallel (i.e., concurrently).

In one or more embodiments of the invention, a GPU may service a processing request by obtaining the data specified in the processing request, processing the data in accordance with the processing task, generating a result, and storing the result in the shared memory.

In step 224, a notification of completed data processing is sent to the host operating system. The notification may specify the location(s) of the data and the correspond result.

The following section describes two non-limiting examples of various embodiments of the invention. The examples are not intended to limit the scope of the invention.

EXAMPLE 1

TABLE 1

| Point in Time | Write Request Obtained | Time Window (units of time) | Write Requests to be offloaded |
|---|---|---|---|
| T1 | Write Request (WR) 1 | 5 | WR1 |
| T2 | WR2 | 3 | WR1, WR2 |
| T3 | WR3 | 4 | WR1, WR2, WR3 |
| T4 | WR4 | 4 | WR4 |
| T5 | — | — | WR4 |
| T6 | — | — | WR4 |
| T7 | — | — | WR4 |
| T8 | — | — | WR4 |

Consider a scenario in which a host OS obtains write requests and services the write requests in accordance with FIG. 2A. Table 1 shows information about write requests received by the host OS. More specifically, each row of Table 1 specifies a point in time, a write request that is obtained at the point in time, a time window of the obtained write request in which to offload processing of data associated with the write request, and any write requests that are to be offloaded. For purposes of this example, assume that the threshold number of write requests is three.

With reference to Table 1, the host OS obtains a first write request (WR) at a first point in time T1. WR1 associated with a time window of five units of time. The host OS initiates a first timer for WR1 and stores data associated with WR1 in the shared memory. The host OS then determines that the threshold number of write requests (i.e., three) have not been obtained at T1.

At a second point in time T2, a second write request (WR2) is obtained. WR2 is associated with a time window of three units of time. The host OS initiates a second timer for WR2 and stores data associated with WR2 in the shared memory. The host OS then determines that a threshold number of write request have not been obtained at T2. Further, the host OS determines that time elapsed for WR1, as tracked by the first timer, does not meet or exceed its time window of five units of time.

At a third point in time T3, WR3 is obtained. WR3 is associated with a time window of four units of time. The host OS initiates a third timer for WR3 and stores data associated with WR3 in the shared memory. The host OS determines that a threshold number of write requests has been obtained. In response to the determination, the host OS sends an offload request to a specialized VM that specifies WR1, WR2, and WR3. The Host OS also clears the first, second, and third timers.

At a fourth point in time T4, WR4 is obtained. WR4 is associated with a time window of four units of time. The host OS initiates a fourth timer for WR4 and stores data associated with WR4 in the shared memory. The host OS determines that the threshold number of write requests have not been obtained at T4 because only WR4 is to be processed.

At a fifth point in time T5, no write requests are obtained. The host OS determines that the threshold number of write requests have not been obtained at T5. Further, the host OS determines that the elapsed time for WR4, as tracked by the fourth timer, does not meet or exceed the time window of four units of time.

At a sixth point in time T6, no write requests are obtained. The host OS determines that the threshold number of write requests have not been obtained at T6. Further, the host OS determines that the elapsed time for WR4, as tracked by the fourth timer, does not meet or exceed the time window of four units of time.

At a seventh point in time T7, no write requests are obtained. The host OS determines that the threshold number of write requests have not been obtained at T7. Further, the host OS determines that the elapsed time for WR4, as tracked by the fourth timer, does not meet or exceed the time window of four units of time.

At an eighth point in time T8, no write requests are obtained. The host OS determines that the threshold number of write requests have not been obtained at T8. Further, the host OS determines that the elapsed time for WR4, as tracked by the fourth timer, does meet time window of four units of time. In response, the host OS sends a second offload request to a specialized VM that specifies WR4. The specialized VM may be the specialized VM that obtained the first offload request.

End of Example 1

EXAMPLE 2

Consider a scenario in which a client VM (302A) requests to process a data using DIF calculations and store the processed data in backup storage (350). The host computing device (300) may perform the methods of FIGS. 2A-2B to process and store the data.

The client VM (302A) sends a first write request to the host OS (310) [1]. The write request may specify storing first data in a backup storage device (350). The write request may specify that the first data be processed prior to storing in the backup storage device (350). After obtaining the write request, a first timer is started. The host OS may obtain a number of write requests and if the first timer exceeds a time window (i.e., 10 seconds), the host OS may send an offload request to the specialized VM (304A, 304N). Alternatively, if the host OS obtains a threshold number of write request (i.e., three) before the first timer exceeds the time window, the host OS (310) sends an offload request to the specialized VM.

The host OS (310), after obtaining the first write request, stores the first data in the shared memory (324) [2]. At a later point in time, a second write request is obtained [3]. The second write request may specify second data. The host OS (310), after obtaining the second write request, stores the second data in the shared memory (324) [4]. At a third point in time, a third write request is obtained [5]. The third write request may specify third data. The host OS (310), after obtaining the third write request, stores the third data in the shared memory (324) [6]. At this point in time, the first timer has not exceeded the time window of the first write request, but the threshold number of write requests (i.e., three) are obtained. The host OS (310) may use an offload component (312) to send an offload request to a specialized VM (304N) [7] that specifies the first, second, and third write requests.

The specialized VM (304M), upon receipt of the offload request, identifies a processing task to perform on the data specified in the offload request. In this example, an identified processing task specifies performing a data integrity field (DIF) calculation on data associated with the three write requests to generate processed data.

The specialized VM (304M) instructs the GPUs (326) to perform the DIF calculations on the data by sending processing tasks that each specify the processing task and an address that specifies a location in the shared memory (324) in which data of a write request is stored [8]. The GPUs (326) obtain the data from the shared memory (324) using the addresses of each processing request [9]. The GPUs (326) may service each processing request in parallel by processing data of a write request in accordance with the processing task, resulting in processed data. After processing the data, the GPUs (326) may store the processed data in the shared memory (324) [10].

The specialized VM (304M) may be notified of completed data processing [11]. The specialized VM (304M) may forward the notification to the host OS (310) [12]. The notification may include logical addresses specifying the location of the processed data stored in the shared memory (324). The host OS (310) may use the addresses to obtain the processed data [13]. The host OS (310) stores the data in the backup storage device (350) [14]. The host OS (310) may utilize the processor (322) to send the processed data to the backup storage device.

End of Example 2

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the delegation of performing specific operations associated with a data processing by a computing device with multiple processors each with varying capabilities.

A computing device may include a processor (e.g., a CPU) that may be suited to perform a portion of operations of the data processing that involves a small number of complex computations. The data processing may include performing large numbers of simple, arithmetic calculations. Embodiments of the invention may offload the large number of simple calculations to graphics processing units (GPUs). Because the GPUs include a larger number of processing cores compared to a CPU, the GPUs may be suited to more efficiently complete the larger number of simple calculations.

Further, the GPUs may be suited to perform multiple processing requests in parallel. Embodiments of the invention may optimize the parallel processing capabilities of the GPUs by sending an offload request that specifies a maximum number of processes that the GPUs may service in parallel. Embodiments of the invention may track an elapsed time of each write request to determine whether to offload the write request to the GPUs or wait until additional write requests have been obtained. Thus, embodiments of the invention may maximize the GPU usage while ensuring the write requests are processed within a desired time window.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, the method comprising:
   receiving a write request by a host operating system during a predetermined time window;
   storing data associated with the write request in a shared memory;

making a first determination that a threshold number of write requests are obtained within the predetermined time window, wherein the threshold number of write requests corresponds to a number of write requests that may be serviced in parallel by a plurality of computing resources;

in response to the first determination, sending an offload request to a virtual machine (VM) to perform a plurality of processing requests associated with the write request, wherein the offload request specifies at least the write request; and in response to the offload request:
  issuing, by the VM, the plurality of processing requests to the plurality of computing resources; and
  servicing, by the plurality of computing resources, each processing request of the plurality of processing requests to obtain a plurality of results.

2. The method of claim 1, further comprising:
receiving a second write request by the host operating system during a second predetermined time window;
storing second data associated with the second write request in the shared memory;
making a second determination that a duration of the second predetermined time window has been reached and that the threshold number of write requests were not obtained within the second predetermined time window; and
in response to the second determination, sending a second offload request to a second VM, wherein the second offload request specifies at least the second write request.

3. The method of claim 1, wherein servicing each processing request comprises:
obtaining a portion of the data stored in shared memory;
generating a result of the plurality of results using the portion of the data; and
storing the result in the shared memory.

4. The method of claim 3, wherein each processing request of the plurality of processing requests is serviced in parallel.

5. The method of claim 1, further comprising:
after servicing each processing request of the plurality of processing requests:
  storing the data and the plurality of results in a backup storage device.

6. The method of claim 1, wherein a computing resource of the plurality of computing resources is a graphics processing unit (GPU).

7. A non-transitory computer readable medium comprising computer readable program code, which when executed by a computer processor enables the computer processor to perform a method, the method comprising:
receiving a write request by a host operating system during a predetermined time window;
storing data associated with the write request in a shared memory;
making a first determination that a threshold number of write requests are obtained within the predetermined time window, wherein the threshold number of write requests corresponds to a number of write requests that may be serviced in parallel by a plurality of computing resources;
in response to the first determination, sending an offload request to a virtual machine (VM) to perform a plurality of processing requests associated with the write request, wherein the offload request specifies at least the write request; and in response to the offload request:
  issuing, by the VM, the plurality of processing requests to the plurality of computing resources; and
  servicing, by the plurality of computing resources, each processing request of the plurality of processing requests to obtain a plurality of results.

8. The non-transitory computer readable medium of claim 7, the method further comprising:
receiving a second write request by the host operating system during a second predetermined time window;
storing second data associated with the second write request in the shared memory;
making a second determination that a duration of the second predetermined time window has been reached and that the threshold number of write requests were not obtained within the second predetermined time window; and
in response to the second determination, sending a second offload request to a second VM, wherein the second offload request specifies at least the second write request.

9. The non-transitory computer readable medium of claim 7, wherein servicing each processing request comprises:
obtaining a portion of the data stored in shared memory;
generating a result of the plurality of results using the portion of the data; and
storing the result in the shared memory.

10. The non-transitory computer readable medium of claim 9, wherein each processing request of the plurality of processing requests is serviced in parallel.

11. The non-transitory computer readable medium of claim 7, the method further comprising:
after servicing each processing request of the plurality of processing requests:
  storing the data and the plurality of results in a backup storage device.

12. The non-transitory computer readable medium of claim 7, wherein a computing resource of the plurality of computing resources is a graphics processing unit (GPU).

13. A system, comprising:
a processor; and
memory comprising instructions, which when executed by the processor, perform a method, the method comprising:
  receiving a write request by a host operating system during a predetermined time window;
  storing data associated with the write request in a shared memory;
  making a first determination that a threshold number of write requests are obtained within the predetermined time window, wherein the threshold number of write requests corresponds to a number of write requests that may be serviced in parallel by a plurality of computing resources;
  in response to the first determination, sending an offload request to a virtual machine (VM) to perform a plurality of processing requests associated with the write request, wherein the offload request specifies at least the write request; and
  in response to the offload request:
    issuing, by the VM, the plurality of processing requests to the plurality of computing resources, wherein a computing resource of the plurality of computing resources is a graphics processing unit (GPU); and servicing, by the plurality of computing resources, each processing request of the plurality of processing requests to obtain a plurality of results.

14. The system of claim 13, the method further comprising:
receiving a second write request by the host operating system during a second predetermined time window;
storing second data associated with the second write request m the shared memory;
making a second determination that a duration of the second predetermined time window has been reached and that the threshold number of write requests were not obtained within the second predetermined time window; and
in response to the second determination, sending a second offload request to a second VM, wherein the second offload request specifies at least the second write request.

15. The system of claim 13, wherein servicing each processing request comprises:
obtaining a portion of the data stored in shared memory;
generating a result of the plurality of results using the portion of the data; and
storing the result in the shared memory.

16. The system of claim 15, wherein each processing request of the plurality of processing requests is serviced in parallel.

17. The system of claim 13, the method further comprising:
after servicing each processing request of the plurality of processing requests:
storing the data and the plurality of results in a backup storage device.

* * * * *